Nov. 3, 1959 C. G. SONTHEIMER 2,911,527

SELF CENTERING DISCRIMINATOR AND CONTROL CIRCUIT

Filed Aug. 11, 1954

INVENTOR.

CARL G. SONTHEIMER

BY

Curtis, Morris & Safford

ATTORNEYS 2,911,527

SELF CENTERING DISCRIMINATOR AND CONTROL CIRCUIT

Carl G. Sontheimer, Riverside, Conn., assignor to C.G.S. Laboratories, Inc., Stamford, Conn., a corporation of Connecticut Application August 11, 1954, Serial No. 449,193

11 Claims. (Cl. 250—27)

This invention relates to electrical control apparatus and is described as embodied in apparatus for controlling one or more electrical circuits in accordance with the frequency of an applied signal.

Controllable inductors have been used to control tuned circuits and have the advantage that by electrically controlling the magnetic saturation of the core of the inductor the effective value of the inductive portion of the tuned circuit can be controlled. However, the characteristics of such controllable inductors change with changes in ambient conditions such as temperatures and are also affected by the hysteresis of the core material. Where it is desired to provide one or more circuits which will "track," that is, change inductance or tuning characteristics in unison, with an applied signal, apparatus must be provided which will generate a control current that is a function of the frequency of the applied signal and this control current must be modified automatically in such manner as to compensate for the effects of hysteresis, temperature changes, etc.

The present invention provides a simple and highly effective system and apparatus for controlling such circuits and which substantially eliminates the effects of hysteresis and changes in ambient conditions, a single control system being arranged to control a number of separate circuits.

The various aspects, objects, and advantages of this invention will be for the most part apparent from the following description of apparatus embodying the invention considered together with the accompanying drawings, in which.

Figure 1:
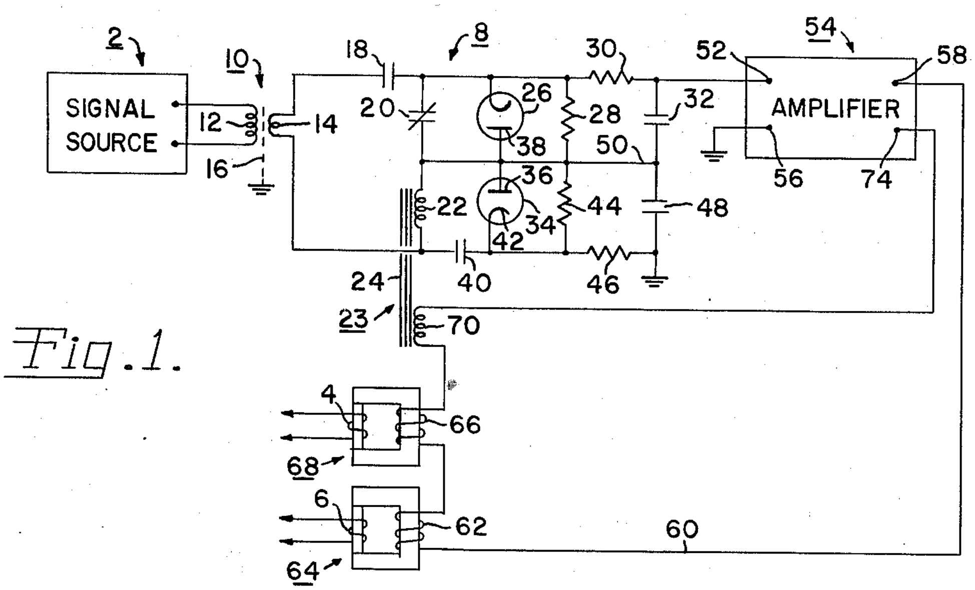
Figure 1 shows a circuit arrangement for controlling a number of inductive elements in accordance with the frequency of an applied signal.

In Figure 1, an alternating current signal is provided by a source 2 and the effective inductances of two signal windings 4 and 6 are made to vary in accordance with the frequency of the signal from the source 2. For example, the signal windings 4 and 6 may form parts of tuned circuits (not shown) so that the resonant frequency of these circuits will track with the frequency of the signal applied from the source 2, and the frequencies of these resonant circuits may be the same as the frequency of the applied signal or they may be different from that of the applied signal but follow changes in the frequency of the signal from the source 2.

In order to produce a voltage which is a function of the frequency of the applied signal, a discriminator 8 is coupled to the signal source through a transformer 10 having a primary winding 12, connected to the signal source 2, and a low impedance secondary winding 14 which is coupled to the primary winding 12 and is separated therefrom by a Faraday screen 16.

The frequency-selective network of the discriminator includes a capacitor 18, a capacitor 20, and a signal winding 22 all connected in series across the transformer winding 14. The signal winding 22 forms part of a controllable inductor 23 having a magnetically saturable core 24.

The voltage appearing across the capacitor 20 is rectified by a diode tube 26 connected in parallel with the capacitor 20, the rectified voltage appearing across a load resistor 28 connected in parallel with the rectifier tube 26. The uni-directional pulsating voltage appearing across the load resistor 28 is filtered by means of a resistor 30 and a capacitor 32 connected in series with each other across the resistor 28.

The voltage appearing across the signal winding 22 of the frequency-selective network is rectified by another half-wave rectifier tube 34 the anode 36 of which is connected to the anode 38 of the diode tube 26 and to the junction of the capacitor 20 and signal winding 22. The other end of the signal winding 22 is coupled through an isolating capacitor 40 to the cathode 42 of the rectifier tube 34, the rectified voltage appearing across a load resistor 44 connected in parallel with the diode tube 34. The pulsating voltage appearing across the resistor 44 is smoothed by a resistor-capacitor filter comprising a resistor 46 connected in series with a capacitor 48 across the load resistor 44.

Because the two diodes are connected in reverse relationship, the direct current (D.-C.) voltages appearing across the capacitors 32 and 48 will be opposed, that is the upper terminal of the capacitor 32 will be positive with respect to the lead 50 which is connected to the junction of the capacitor 20 and the inductor 22 and the lower terminal of the capacitor 48, which is connected in this example to the common ground circuit will also be positive with respect to the lead 50. Accordingly, the input terminal 52 of a D.-C. amplifier 54 will be at a potential, with respect to the common ground circuit, equal to the difference between the voltages appearing on the capacitor 32 and on the capacitor 48.

This resulting control voltage is amplified by the amplifier 54 which is arranged to produce a D.-C. control current which is a function of the voltage appearing between the input terminals 52 and 56 of the amplifier 54. One of the output terminals 58 is connected through a lead 60, a control winding 62 of a controllable inductor 64 in series with a control winding 66 of a controllable inductor 68, and in series with a control winding 70 of the controllable inductor 23 to the other amplifier output terminal 74.

These controllable inductors operate on the principle of a saturable reactor, but in this example are arranged to operate at substantially higher frequencies, for example, in the radio frequency range. Such controllable inductors may incorporate a core of ferromagnetic material such as ferrite. This ferrite material may form all of the magnetic circuit, or part of the magnetic circuit may be replaced by other magnetic material such as iron. Suitable controllable inductors are described in the following U.S. patent applications: Serial No. 310,341, filed September 18, 1952; Serial No. 300,746, filed July 24, 1952, and issued August 6, 1957, as Patent No. 2,802,185; Serial No. 425,244, filed April 23, 1954, now Patent No. 2,869,087; and in the copending application of William R. Smith-Vaniz, Jr. entitled "Control Method and Apparatus," Serial No. 449,881, filed August 16, 1954.

In brief, the D.-C. current through the control winding effects a partial saturation of the ferromagnetic core. If the magnitude of the control current is changed, the saturation of the core material is changed accordingly and the signal winding coupled to the same core assumes a new inductance value. In practice, the control current delivered by the amplifier to the control windings 62, 70, and 66 when no signal is applied to the input terminals 52 and 56 of the amplifier is such as to bias the magnetic saturation of the cores 64, 68, and 24 at about the midpoint of the operating range of the signal windings.

To explain the operation of the circuit, it is best to assume that the capacitor 18 is short-circuited, because this capacitor may be eliminated entirely from the circuit in some instances. Under these conditions, if the resonant frequency of the series circuit formed by the capacitor 20 and the signal winding 22 is equal to the frequency of the applied signal from the source 2, the voltage developed in the capacitive portion of the network will be equal to the voltage developed in the inductive portion of the network, so that the voltage developed on the capacitors 32 and 48 will be equal to each other and no voltage will appear between the input terminals 52 and 56 of the amplifier 54.

If, however, the frequency of the signal from the source 2 is increased, the voltage developed across the signal winding 22 will be greater than that developed across the capacitor 20, so that a negative voltage will be applied to the input terminal 52 of the amplifier with respect to ground. This D.-C. amplifier is so arranged that as the voltage on the input terminal 52 of the amplifier becomes more negative with respect to the common ground circuit, the output current provided by the amplifier, which flows through the control windings 62, 66, and 70, will increase. As the current through the control winding 70 increases, the magnetic saturation of its core 24 is increased and the inductance of its signal winding decreases. This decrease in the inductance of the signal winding 22 increases the resonant frequency of the network formed by the capacitor 20 and the signal winding 22 until it is again substantially equal to the frequency of the signal from the source 2, and the voltage appearing between the terminals 52 and 56 of the amplifier is minimized.

The converse effect takes place if the frequency of the signal from the source 2 decreases to a value below the resonant frequency of the network formed by the capacitor 20 and the signal winding 22, in which case a larger voltage appears across the capacitor 20 and a positive voltage is applied to the amplifier terminal 52. As the terminal 52 becomes more positive the control current through the control windings 62, 66, and 70 decreases thereby increasing the effective inductance of the signal winding 22 and lowering the resonant frequency of the discriminator network until it again substantially coincides with the frequency of the applied signal.

It will be apparent that the usual considerations of such closed loop control circuits apply and that the accuracy of the system will depend upon the amplification introduced into the control circuit.

The control windings 66 and 62 are connected in series with the control winding 70 so that the saturation of the cores of the controllable inductors 64 and 66 will correspond to the saturation of the core 24 of the controllable inductor 23 and the effective inductance of the respective signal windings 4 and 6 will vary in unison with the changes in the frequency of the signal from the source 2.

It will be apparent that any instability in the controllable inductor 23 will be compensated automatically by the control circuit because the current through the control winding 70 will always be such as to maintain the discriminator circuit resonant at the frequency of the applied signal. Accordingly, the effects of hysteresis and temperature are largely eliminated. The controllable inductors 64 and 68 which will have the same magnetic history and which are subject to the same ambient conditions of operation will also be compensated.

When operating at relatively high frequencies, for example several tens of megacycles, the signal winding 22 does not present a pure inductance to the circuit but has significant associated capacitive effects. Accordingly, the frequency at which the maximum voltage is developed across the inductor 22 does not coincide with the exact frequency at which the inductive reactance is equal to the capacitive reactance of the inductor 20. For this reason, the capacitive portion of the network is formed in two parts by the series connection of the capacitors 18 and 20 and only the voltage appearing across the capacitor 20 is used to develop the D.-C. voltage across the capacitor 32. The relative values to be selected for these two capacitors will depend upon the frequency of operation and upon the amount of capacitance associated with the signal winding 22.

In one particular apparatus adapted for operation between 50 and 100 megacycles, the discriminator unit, including the frequency-selective network, the diode tubes, and filter circuits, was mounted on a brass plate represented by the lead 50. The capacitor 18 had a value of approximately 50 micro-microfarads. The capacitor 20 was adjustable from 7 to 45 micro-microfarads and in operation was adjusted to a value of approximately 20 micro-microfarads. The coupling capacitor 40 had a value of about 30 micro-microfarads. The load resistors 28 and 42 were each 20,000 ohms. The filter resistors 30 and 36 were each 6800 ohms. The capacitor 32 had a value of about 750 micro-microfarads, and the capacitor 48 had a value of about 800 micro-microfarads. The latter capacitor 48 was formed by a mica sheet interposed between the brass plate which supported the discriminator and the metal chassis which formed the common ground circuit.

Figure 2:
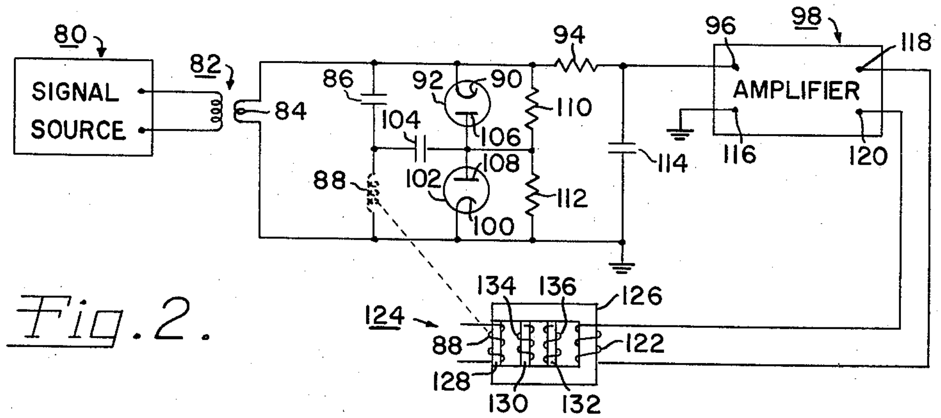
Figure 2 shows a modified arrangement for controlling a number of inductive elements.

Figure 2 shows another control arrangement generally similar to the unit previously described but in which a similar controllable inductor having a number of separate signal windings is utilized.

In this example, the signal from a source 80 is coupled through a transformer 82 the low impedance secondary winding 84 of which is connected across the frequency discriminating circuit comprising a fixed capacitor 86 connected in series with a signal winding 88. One terminal of the capacitor 86 is connected to the cathode 90 of a diode rectifier tube 92 and through a filter resistor 94 to an input terminal of a D.-C. amplifier 98.

One end of the signal winding 88 is connected to the common ground circuit and to a cathode 100 of a second diode rectifier tube 102. The junction of the capacitor 86 and signal winding 88 is connected through a coupling capacitor 104 to the anodes 106 and 108 of the diode tubes 92 and 102 respectively. A load resistor 110 is connected in parallel with the diode tube 106 and develops a voltage which is opposed by the voltage developed across a second load resistor 112 which is connected in parallel with the diode tube 102. A filter capacitor 112 is connected between the input terminal 96 of the amplifier 98 and the common ground circuit. The other input terminal 116 of the amplifier 98 also is connected to the common ground circuit.

The output terminals 118 and 120 of the amplifier 98 are connected to a control winding 122 of a controllable inductor 124. This controllable inductor 124 includes a yoke type core 126 of ferromagnetic material, such as iron, across which are bridged three ferrite signal core portions 128, 130, and 132 which respectively carry signal windings 88, 134, and 136. The signal winding represented in this structure at 88 is the same signal winding which forms a portion of the frequency-responsive network of the discriminator.

From the considerations set forth above in connection with Figure 1, it will be apparent that the effective inductances of the windings 134 and 136 will vary in unison with the effective inductances of the signal winding 88 which is under the precise control of the applied signal.

Figure 3:
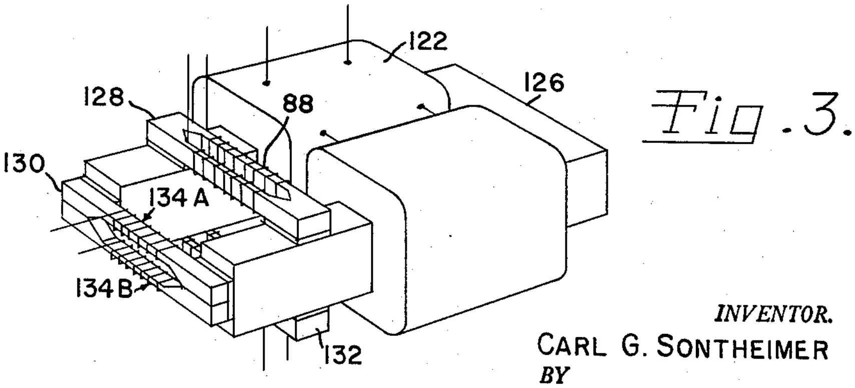
Figure 3 illustrates one type of controllable inductor which may be used in the arrangement shown in Figure 2.

A controllable inductor of the type illustrated diagrammatically in Figure 2 is shown in perspective in Figure 3 in which the parts corresponding to those represented in Figure 2 are indicated by corresponding reference numerals. It will be noted that each of the signal windings 88, 134, and 136 is divided into two parts wound around opposing edge portions of the ferrite cores 128, 130, and 132. For example, the winding 134 is formed of portions 134A and 134B which are connected in series and arranged so that the flux created by current through this winding flows in a closed loop around the slot in the ferrite core through which these winding portions extend. The purpose of this arrangement is to prevent inductive coupling or transformer action between the winding 122 and the individual signal windings, and to minimize coupling between the respective signal windings.

This invention is applicable to many different fields of application. For example, it is useful in tuning devices where several resonant circuits are to be controlled in accordance with the frequency of an applied signal. In Figure 2, for example, the arrangement may be utilized in a radio receiver. The signal source 80 represents the local oscillator of a superheterodyne receiver. The signal winding 134 may be connected into the resonant circuit in the antenna stage of the receiver, and the signal winding 136 may form the inductive portion of a resonant circuit in a radio frequency amplifier stage of the receiver. The signal winding 88 may be utilized to tune the discriminator circuit as described above. In this particular example it will be apparent that the antenna and radio frequency stages of the receiver will not be tuned to the same frequency as the local oscillator, but will differ therefrom by an amount equal to the intermediate frequency of the receiver. However, the antenna and radio frequency circuits must vary in unison with, that is they must track, the oscillator signal. This constant frequency difference can be maintained by the use of suitable padding and trimming inductances in connection with the signal winding 88 or in connection with the signal windings 134 and 136.

From the foregoing it will be seen that the apparatus embodying the invention is well-adapted to attain the ends and objects set forth above and that the particular circuit details are adapted to a variety of modifications in order to best suit the apparatus for each particular use. However, the circuit arrangements set forth are suitable in substantially the illustrated form for many different applications.

I claim:

1. Apparatus for producing a control current whose amplitude is a function of the frequency of an applied signal comprising a source of alternating signal voltage, an electrically-controllable inductor having a saturable magnetizable core and control and signal windings on said core, said control winding varying the magnetic saturation of said core in accordance with the control current therethrough for varying the inductance of the signal winding a self-zeroing discriminator having a frequency-selective network including said signal winding as an element thereof, the frequency-selective characteristics of said network being controlled by the inductance of said signal winding, said self-zeroing discriminator being arranged to provide a minimum output signal when the frequency-selecting characteristics of said network bear a predetermined relationship to the frequency of said signal, and amplification means coupled to the output of said discriminator and to said control winding and arranged to produce in said control winding a rebalancing current of such magnitude as to minimize the magnitude of the output signal from said discriminator.

2. Apparatus for producing a control current whose amplitude is a function of the frequency of an applied signal comprising a source of alternating signal for tuning the resonant frequency of a tuned circuit as a function of the frequency of said applied signal voltage, electrically-controllable inductor means having magnetically saturable core means with a control circuit for controlling the magnetic saturation of said core means and a plurality of signal windings on said core means and in which the effective inductance of the signal windings is a function of the magnitude of the current through said control circuit, a discriminator having a frequency-selective network including one of said signal windings as an element thereof and which is arranged to deliver a direct voltage signal having minimum value when the resonant frequency of said network is near the frequency of said applied signal and having a first polarity when the resonant frequency of said network is below the frequency of said signal and the opposite polarity when the resonant frequency of said network is above the frequency of said applied signal, amplifier means coupled to said discriminator and to said control circuit and arranged to produce in said control circuit a current that is a function of the signal from said discriminator, said current being such as to minimize the magnitude of the signal from said discriminator, a tuned circuit including another of said signal windings as an element thereof whose resonant frequency is tuned by the effective inductance of said other signal winding, whereby the resonant frequency of said tuned circuit is tuned as a function of the frequency of said applied signal.

3. Apparatus for producing a control current whose amplitude is a function of the frequency of an applied signal and controlling a controlled circuit as a function thereof comprising a source of alternating signal voltage, electrically-controllable inductor means having magnetically saturable core means, a control winding means for regulating the magnetic saturation of said core means and a plurality of signal windings whose inductance is a function of the degree of magnetic saturation of said core apparatus as varied by current through said control winding means, a frequency-selective network coupled to said source and having a capacitive branch and an inductive branch, said inductive branch including one of said signal windings, first rectifying means coupled to said capacitive branch and arranged to produce therefrom a first uni-directional potential, second rectifying means connected to said inductive branch and arranged to produce therefrom a second uni-directional potential, means for comparing the relative amplitudes of said first and second potentials and for producing a control current whose value is a function of the difference in magnitude between said first and second potentials, circuit means for coupling said control current to said control winding thereby to cause the effective inductances of each of said signal windings to vary in unison with changes in the frequency of said signal, and a controlled circuit including another of said signal windings and being controlled in accordance with the inductance of said last signal winding.

4. Apparatus as claimed in claim 3 wherein said electrically controllable inductor core means comprises a ferromagnetic yoke and a plurality of ferrite core members bridged across said yoke, said control winding means comprising an inductive winding around said yoke, and said signal windings each being around one of said ferrite core members, with the inductance of each signal winding being responsive to the magnetic saturation of the respective associated core member.

5. Apparatus as claimed in claim 3 wherein said controllable inductor means includes a plurality of separate magnetizable cores each carrying one of said signal windings, and said central winding means comprises a plurality of control windings connected together and each wound on one of said cores.

6. Apparatus for producing a control current whose amplitude is a function of the frequency of an applied signal for controlling a plurality of controllable inductors as a function of the frequency of the applied signal, comprising a source of alternating signal voltage of variable frequency, a plurality of electrically-controllable inductors having saturable magnetizable core means formed at least in part of ferrite and control and signal windings on said core means, a self-zeroing discriminator including a capacitor connected in series with one of said signal windings and coupled to said source, and rectification means arranged to provide a direct voltage output signal having minimum magnitude when the resonant frequency of said network is near the frequency of said signal, a direct current amplifier having input and output circuits, means coupling said input circuit to said discriminator, and means coupling said output circuit to each of said control windings and arranged to produce in the control winding associated with said one signal winding control current to minimize the magnitude of the output signal from said discriminator, said control current in the control windings of the other controllable inductors thereby controlling them as a function of the frequency of the applied signal.

7. A control system comprising a controllable inductor having a core of magnetic material, a control winding thereon arranged to saturate magnetically at least a portion of said core in accordance with the magnitude of the current through said control winding, and a plurality of signal windings on portions of said core having effective inductance values which are functions of the extent of magnetic saturation of said core portions, a source of alternating current signal, a tunable discriminator network coupled to said source and including a capacitor connected in series with one of said signal windings, a first rectifier arranged to rectify the voltage appearing across said capacitor, a second rectifier arranged to rectify the voltage appearing across said one signal winding, means combining in opposition the voltages produced by said first and second rectifiers, means for generating a control current which is a function of the difference in magnitude between said voltages from said rectifiers, and means coupling said control current to said control winding, whereby the inductance of each of said signal windings is controlled as a function of the frequency of said alternating current signal.

8. Apparatus as claimed in claim 7 including at least one additional controllable inductor having a core and control and signal windings thereon and in which the control winding of said additional controllable inductor is connected in series with the control winding of said first-named controllable inductor.

9. A control system comprising a controllable inductor having a core portion of magnetically saturable material, a control winding magnetically coupled to said core portion and arranged to control the degree of magnetic saturation of said core portion in accordance with the magnitude of current through said control winding, a signal winding on said core portion having an effective inductance varied by the amount of magnetic saturation of said core portion, a source of alternating current, a tunable discriminator network coupled to said source, said tunable discriminator network including a capacitor connected in series with said signal winding, a first resistor and a first half-wave rectifier connected in parallel with each other and both coupled across said capacitor, a second resistor and a second half-wave rectifier connected in parallel with each other and both coupled across said signal winding, said first and second resistor being connected in circuit in series with each other, a third resistor connected to one of said resistors, capacitance means connected across all three resistors, an amplifier connected across said capacitance means for generating a control current which is a function of the difference in voltage appearing across said first and second resistors, circuit means coupling the control current to said control winding, and at least one other signal winding having a magnetically saturable core portion with its degree of magnetic saturation controlled by said control current.

10. In a system for controlling and stabilizing the operation of a plurality of tuned circuits, apparatus comprising a source of alternating current voltage, a frequency-responsive network connected to said source and including series-connected capacitance and inductance means, first rectification means connected to said network and arranged to produce a first direct voltage whose magnitude is a function of the voltage from said source appearing across said inductance means, second rectification means connected to said network and arranged to produce a second direct voltage whose magnitude is a function of the voltage from said source appearing across said capacitance means, means for combining said first and second direct voltage in opposition to produce a resultant direct current control signal, controllable inductor means having control winding means and magnetically saturable core means connected to said direct current control signal and including a plurality of signal windings on said magnetically saturable core means, one of said signal windings being arranged to maintain the frequency produced by said source and the resonant frequency of said frequency responsive network substantially identical, and a plurality of tuned circuits, including as an element thereof another of said signal windings.

11. A stabilized signal-generating system including an oscillator, a discriminator system coupled to said oscillator and including first frequency-responsive means producing a signal whose magnitude increases with decreasing frequency of said oscillator, second frequency-responsive means producing a signal whose magnitude decreases with decreasing frequency of said oscillator, rectification means arranged to produce first and second direct voltages the magnitude of which are functions respectively of the magnitudes of said signals produced by said first and second frequency-responsive means, and means combining said direct voltages in opposition to produce a resultant direct control signal, and controllable inductor means including control winding means, magnetically permeable core means having said control winding means thereon, said core means including magnetically saturable regions, signal windings means being on said magnetically saturable regions, said control winding means being under the control of said direct control signal, said signal winding means being arranged to maintain the frequency at which first and second direct voltages are equal and the frequency of said oscillator substantially identical.

References Cited in the file of this patent

UNITED STATES PATENTS

| | | |
|---|---|---|
| 2,085,061 | Aggers | June 29, 1937 |
| 2,190,319 | Koch | Feb. 13, 1940 |
| 2,382,615 | Donley | Aug. 14, 1945 |
| 2,415,469 | Webb | Feb. 11, 1947 |

FOREIGN PATENTS

| | | |
|---|---|---|
| 535,993 | Great Britain | Apr. 29, 1941 |
| 564,236 | Great Britain | Sept. 19, 1944 |

UNITED STATES PATENT OFFICE

CERTIFICATE OF CORRECTION

Patent No. 2,911,527 November 3, 1959

Carl G. Sontheimer

It is hereby certified that error appears in the printed specification of the above numbered patent requiring correction and that the said Letters Patent should read as corrected below.

Column 5, lines 69 to 71, for "signal comprising a source of alternating signal for tuning the resonant frequency of a tuned circuit as a function of the frequency of said applied signal voltage," read -- signal for tuning the resonant frequency of a tuned circuit as a function of the frequency of said applied signal comprising a source of alternating signal voltage, --.

Signed and sealed this 1st day of November 1960.

(SEAL)

Attest:

KARL H. AXLINE
Attesting Officer

ROBERT C. WATSON
Commissioner of Patents